Aug. 24, 1965    M. V. REYNOLDS ETAL    3,201,827
TUBE-STRETCHING MANDREL
Filed April 8, 1963

INVENTORS
MAURICE V. REYNOLDS
ROSARIO J. PERRONE

*V.F. Volk*

THEIR AGENT

United States Patent Office 3,201,827
Patented Aug. 24, 1965

3,201,827
TUBE-STRETCHING MANDREL
Maurice V. Reynolds and Rosario J. Perrone, Marion, Ind., assignors, by mesne assignments, to Anaconda Wire and Cable Company, a corporation of Delaware
Filed Apr. 8, 1963, Ser. No. 271,414
2 Claims. (Cl. 18—1)

Our invention relates to a mandrel for radially stretching rubber and plastic tubes and particularly to such mandrels having a plurality of balls rotatably embedded therein.

In the manufacture of heat-shrinkable tubing the said tubing is heated to a temperature below its softening point and stretched. It is cooled in the stretched condition so that it retains its new dimensions in storage. When desired the tubing can be shrunk to its original size by heating it again to a temperature below its softening point. When such tubing is stretched it is essential to stretch it radially but not lengthwise. The reason for this is that, when the tubing is shrunk, it is almost always shrunk down on some object, such as an electrical cable splice, where it is desired to grip the object firmly but not to creep back on the object, and thereby expose some portion thereof. When the tubing is to be expanded in short lengths this radial expansion can be easily accomplished by means of an expanding mandrel but when it is desired to expand the tubing in long sections or continuous lengths no entirely satisfactory method of expanding the tubing radially without expanding it lengthwise has been known. If the tubing is expanded by pulling it over a conical plug the problem has been that when the apex angle of the plug is small so that there is a long taper, the increased length of the mandrel increases the surface friction to a point where the tube is stretched lengthwise as well as radially. If, on the other hand, the cone has a wide apex angle, the lengthwise component of the angle of surface contact will be large relative to the radial component and this also will result in a lengthwise stretching of the tube. The problem is aggravated by the difficulty of supplying lubrication to the mandrel for continuous or very long lengths of tubing and the fact that lubricants, particularly when they are applied to heated materials, may be absorbed and have an adverse effect on the properties of the tubing or the object over which the tubing will eventually be shrunk.

We have discovered that tubing can be expanded radially without any objectionable degree of lengthwise expansion by pulling it over a mandrel comprising a plug having a tapered surface and a plurality of balls rotatably imbedded in said surface and extending outwardly therefrom. The balls are distributed over substantially all of the surface so that the tubing is supported entirely on the surface of the balls. Preferably our mandrel comprises a solid tapered block with ball-receiving bores projecting into it and has means partially obstructing the bores to hold the balls in. When our mandrel is used for stretching sections of tubing it may have a rod substantially equal in length to the sections fastened to extend coaxially from it.

A more thorough understanding of our invention can be gained from a study of the appended drawing.

Figure 2:
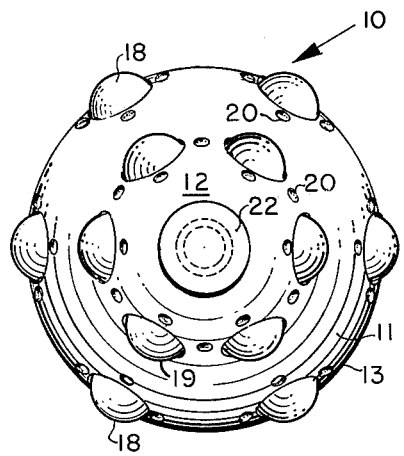
FIGURE 2 is a front view of the mandrel of FIGURE 1.
Figure 1:
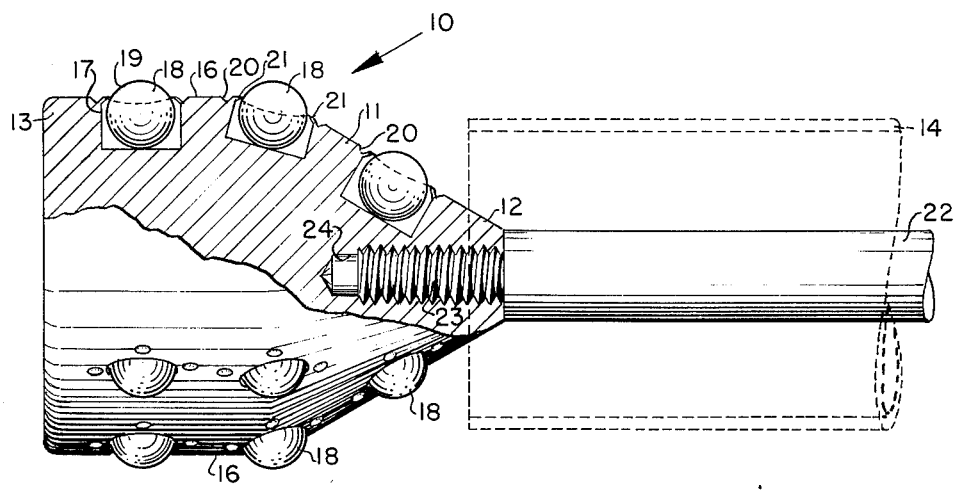
FIGURE 1 is a side view of a mandrel made in accordance with our invention.

The mandrel indicated generally by the numeral 10 comprises a tapered plug 11 terminating in a narrow apex 12 and a broad base 13. The apex 12 is small enough to fit into a tube 14 which it is desired to stretch. The preferred embodiment of our mandrel is comprised of a solid block of metal but it will be understood that mandrels otherwise constructed, such as of a hollow shell will also come within the scope of our invention. The plug 11 has a surface 16 normal to which a plurality of bores 17 have been drilled. The bores 17 are distributed over the entire surface 16 and each of the bores 17 encloses a ball 18. The depth of the bores 17 is such that each of the balls 18 has a sector 19 projecting outwardly from the surface 16. The balls 18 are somewhat smaller than the bores 17 so that they can rotate freely therein. In order to keep the balls 18 from falling from the bores 17 the bores are constricted at the top to form obstructions 21 of a diameter smaller than the maximum diameter of the balls 18. This may be conveniently done by peening the surface at the points 20 in the neighborhood of the bores after the balls have been inserted. Since the bores are distributed over the entire surface of the plug 11 and the balls project from the bores, the tubing 14, when it is drawn over the plug 11 will be held away from the surface 16 and will ride on the balls 18 which are free to turn. A long rod 22 having a threaded end 23 and the same axis as the plug 11 is atttached to the apex 12 by turning it into a tapped hole 24. When sections of the tubing 14 having definite lengths of considerable extent are to be enlarged by means of the mandrel 10 the rod 22 is conventiently made to have a length substantially the same as the longest length of tubing to be stretched and the rod 22 is used to pull the mandrel 10 through the tube 14. Where the tubing 14 is of indefinite length the mandrel 10 may be held in place by known magnetic means while the tubing is pulled over it, or the tubing may be run vertically and the mandrel made heavy enough to expand the tubing by means of its weight when the latter is passed up around it.

We have invented a new and useful mandrel by means of which tubing can be stretched radially without being stretched lengthwise and we desire an award of Letters Patent for our invention.

We claim:

1. A mandrel for radially stretching sections of tubing comprising:
   (A) a solid tapered block having a conical surface of revolution,
   (B) a plurality of ball-receiving bores
      (a) projecting into said block,
      (b) said bores being substantially uniformly distributed over substantially the entire surface of said block,
   (C) a like plurality of balls each rotatably inserted in one of said bores and projecting out of said block,
   (D) means partially obstructing said bores thereby retaining said balls, and
   (E) pulling means fastened to said mandrel and extending coaxially therefrom whereby said mandrel can be pulled into said tubing.

2. The mandrel of claim 1 wherein said pulling means is a rod.

References Cited by the Examiner

UNITED STATES PATENTS

| | | | |
|---|---|---|---|
| 1,010,954 | 12/11 | Rasmussen et al. | 153—80.5 |
| 1,615,306 | 1/27 | Lorraine | 153—81 |
| 1,930,825 | 10/33 | Raymond | 153—81 |
| 2,693,618 | 11/54 | Pfeiffer | 18—19 |
| 2,695,420 | 11/54 | Longstreth et al. | 18—1 |
| 2,708,772 | 5/55 | Moncrieff | 18—14 |

WILLIAM J. STEPHENSON, *Primary Examiner.*